United States Patent
Edwin et al.

[11] 4,186,380
[45] Jan. 29, 1980

[54] MULTI-TERMINAL COMPUTER SYSTEM WITH DUAL COMMUNICATION CHANNELS

[75] Inventors: Allan I. Edwin; Melvin T. Bennett, both of Ann Arbor, Mich.

[73] Assignee: Minnesota Mining and Manufacturing Company, St. Paul, Minn.

[21] Appl. No.: 844,339

[22] Filed: Oct. 21, 1977

[51] Int. Cl.² .............................................. H04Q 5/00
[52] U.S. Cl. .............................. 340/147 SC; 340/508
[58] Field of Search .......................... 340/147 SC, 508; 179/15 AL

[56] References Cited

U.S. PATENT DOCUMENTS

| | | | |
|---|---|---|---|
| 3,632,881 | 1/1972 | Graham | 179/15 AL |
| 3,652,798 | 3/1972 | McNeilly | 179/15 AL |
| 3,835,333 | 9/1974 | Balan | 340/147 SC |
| 3,859,468 | 1/1975 | Smith | 179/15 AL |
| 4,042,780 | 8/1977 | Wolters | 179/15 AL |

*Primary Examiner*—Harold I. Pitts
*Attorney, Agent, or Firm*—Krass & Young

[57] ABSTRACT

A communication system for linking a central computer to a plurality of remotely spaced terminals employs a single run of coaxial cable formed in a loop extending in the vicinity of each of the terminals with its two ends terminating adjacent the head-end computer. The output of the computer is provided to a normally operative primary channel transmitter connected to one end of the cable as well as to a normally inoperative, secondary channel transmitter connected to the other end of the cable. Each of the terminals includes receivers for both the primary and secondary channel. Primary channel signal detectors located at the head-end and at each of the terminals energize the secondary channel transmitter and/or the secondary channel receivers at their respective detectors when they fail to receive the primary channel carrier. Failure of the primary channel transmitter or a break in the cable thus causes energization of the secondary transmitter and the secondary channel receivers at those terminals affected by the malfunction. Terminal polling protocols, initiated by the computer, employ both the primary and secondary transmitters to determine the condition of each of the elements of the system.

16 Claims, 1 Drawing Figure

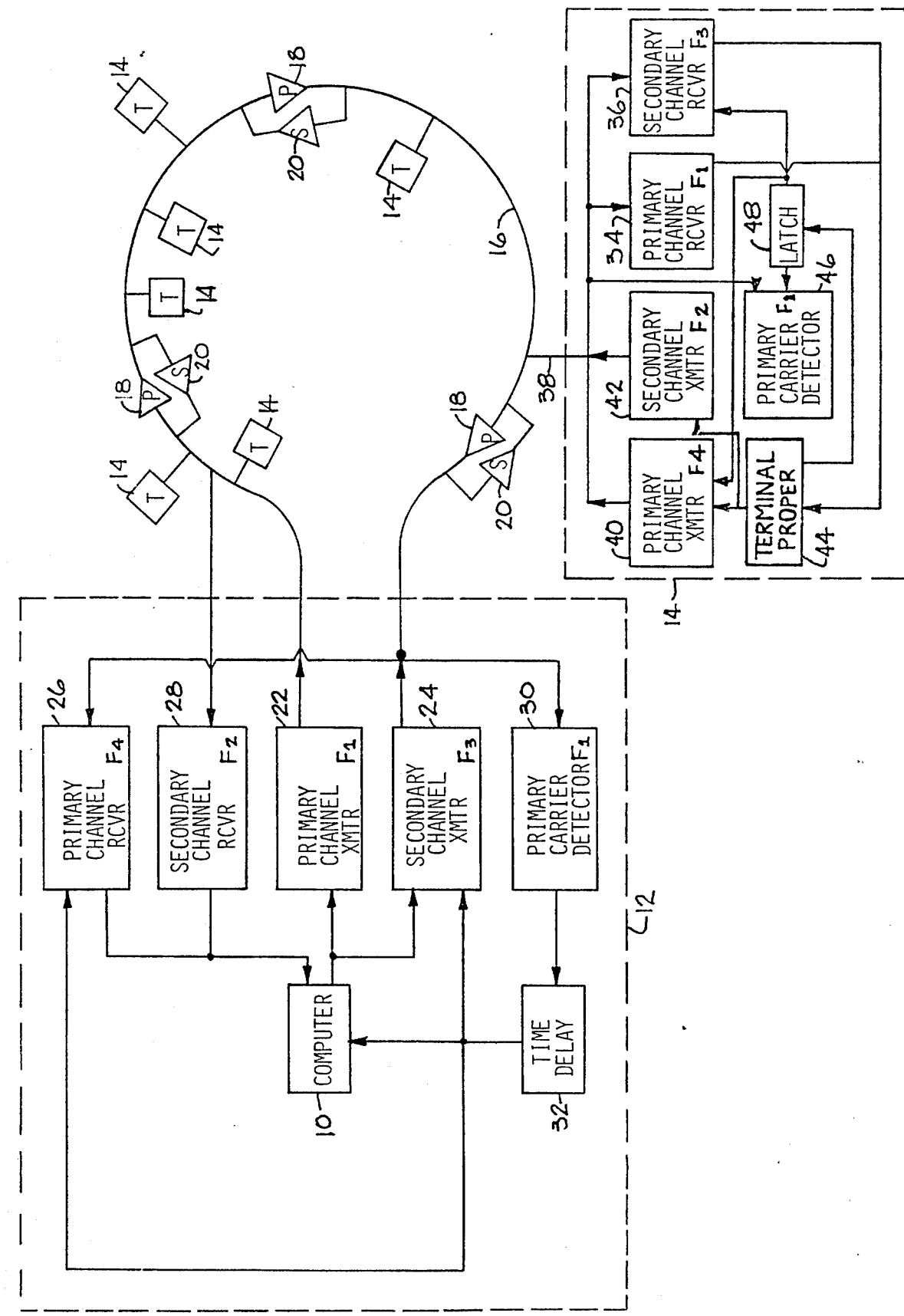

MULTI-TERMINAL COMPUTER SYSTEM WITH DUAL COMMUNICATION CHANNELS

BACKGROUND OF THE INVENTION

1. Field of the Invention

This invention relates to multi-terminal computer systems employing redundant communication links between the computer and the terminals to allow continued operation in the event of a malfunction as well as diagnostic tests to determine the condition of the system elements.

2. Prior Art

Systems employing a central computer connected by a communication channel to a plurality of remotely located terminals are employed in a variety of applications. They may be used in factories to collect and distribute production information and instructions; provide the facilities of the central computer to a variety of users, and in many other applications. The terminals may constitute simple input or output terminals or they may include their own computers which perform various tasks and exchange data with the head-end computer over the communication channel.

Often these systems have polling capability allowing the head-end computer to interrogate the terminals in rapid order to determine their status and to collect information from them. U.S. Pat. No. 3,821,706, assigned to the assignee of the present invention, discloses a system of this type in which each terminal has a unique address and a counter in the terminal is advanced each time the computer outputs a digital command to the system. When the status of the counter in a terminal coincides with the terminal's address, the terminal transmits its status onto the communication channel and the central computer determines the origin of the message based on the status of its counter.

When these systems are employed in applications where substantial damage or economic loss may occur if any part of the system fails, it becomes desirable and economical to employ redundant system elements connected to maintain system operation despite certain types of failure. For example, systems have been provided in which a pair of independent signal transmission lines extend between the head-end computer and each of the terminals. Separate transmitters are provided for each of these lines. The outputs of two lines are summed at each terminal. Only one of the transmitters is used at any time and if failure of the energized transmitter, or some portion of the line connecting it to each of the terminals, is noted, the system switches to the other transmitter and its communication line, preserving operation of the system. This system may be economical when all of the terminals are relatively closely spaced to the central computer, but in applications employing widely spaced terminals the added cost of the redundant transmission line and its installation may be prohibitive.

SUMMARY OF THE INVENTION

The present invention is directed toward a computer system employing a multiplicity of remote terminals which can continue in operation despite the failure of the head-end transmitter or a break in the communication line, but which requires only a single transmission line interconnecting the computer with the terminals. The present system is thus an advantageous alternative to a system employing two separate transmitters and communication lines in environments in which large distances exist between the terminals.

The communication channel used with the present invention may take the form of a signal conductor which may be a coaxial cable, twisted pair, fiber optic channel or the like. In a preferred embodiment of the invention, which will be subsequently disclosed in detail, the conductor is laid in a continuous loop extending through all of the terminal locations and having both of its ends disposed adjacent the head-end computer. The conductor must be capable of transmitting signals in both directions. When a coaxial cable with spaced amplifiers is used the amplifiers must be arranged in a back-to-back relationship to provide bi-directional capability. Each of these amplifiers will accept signals over only a portion of the bandwidth of the conductor.

The system includes two transmitters operative on different band-widths or channels, each connected to one of the ends of the conductor. It would be possible for one of the transmissions to be made by direct current, but preferably both of the transmitters include carrier generators of different frequencies and modulators for putting the data on the channels.

Both of the transmitters receive the output of the head-end computer and one of the transmitters, termed the "primary", is normally operative while the other transmitter, the "secondary" is normally de-energized. Each of the terminals includes receivers or demodulators for both the primary and secondary transmission but the secondary receiver is not normally energized. Both receivers at each terminal are connected to the transmission line.

The energizations of the secondary channel transmitter at the head-end, and the secondary channel receivers at each of the terminals, are controlled by primary channel carrier detectors located at the head-end and at each of the terminals. As long as these units detect the primary channel carrier their associated secondary channel device is de-energized but as soon as a loss of the primary channel carrier is detected the associated secondary channel unit is energized. This failure could occur as a result of failure of the primary channel transmitter, in which case all of the detectors would energize their secondary channel units, or the failure could occur as a result of a break in the transmission line, in which case only those devices on the secondary channel transmitter side of the break would detect the failure. In either event the head-end's secondary channel transmitter would be energized to provide the computer output to all of the terminals not receiving the primary channel carrier, via their secondary channel receivers.

Individual terminal failures in their primary channel circuits can also cause the switch to occur in particular terminals.

After the failure is corrected the affected terminals may return to normal primary channel operation under control of a signal sent by the computer.

While the invention is applicable to systems wherein at least some of the terminals are only capable of the reception of data, and do not include transmitters, in the preferred embodiment of the invention at least some of the terminals include transmission capability and transmit to the head-end over the channel not being used by the head-end transmitter, but preferably employs a frequency band within that channel, which differs from the band used by the head-end transmitter. Thus, when the head-end is transmitting over the primary channel the terminals will respond to the head-end over the secondary channel and when the transmitter is employing a secondary channel the terminals will respond over the primary channel, again using a different frequency band within that channel. In the preferred embodiment of the invention the secondary channel transmitter associated with each terminal is normally operative and the primary channel transmitter is only energized when the carrier detector associated with that terminal has noted a failure in the primary channel carrier. Thus, the carrier detector operates to switch the associated terminal receiver and the associated terminal transmitter simultaneously.

The invention thus allows continued operation of the communication system despite failure of the primary transmitter or the communication line without necessitating the provision of an alternate, redundant transmission line.

The present invention also provides means for diagnosing the condition of the system by detecting and locating failures. This is achieved by polling the terminals, first using one transmitter and then the other transmitter. By comparing the responses received during these two polls the status of both the primary and secondary receivers at each terminal may be checked and any breaks in the cable may be located in terms of its bordering terminals.

BRIEF DESCRIPTION OF DRAWING

Other objectives, advantages and applications of the present invention will be made apparent by the following detailed description of a preferred embodiment of the invention. The description makes reference to the accompanying drawing representing a schematic diagram of the preferred embodiment of the invention.

DESCRIPTION OF ILLUSTRATED EMBODIMENT

The preferred embodiment of the invention comprises a system for achieving bi-directional data communication between a central computer 10 forming part of a physically contiguous head-end section 12, and a plurality of terminals 14 located at separated remote positions relative to the head-end. The invention is equally applicable to less sophisticated systems wherein some or all of the terminals are capable of only unidirectional communication with the central computer, being operative to either transmit or receive messages, as well as to more complicated systems wherein some or all of the terminals include computers or processing elements, so the system may really be viewed as having distributive processing capability. Accordingly, in the drawing, the schematic details of a single terminal 14, having bi-directional communication capability, is illustrated.

The head-end 12 is interconnected with each of the terminals 14 by means of a single continuous loop of communication channel 16 which has both of its ends terminating at the head-end 12. The channel 16 is formed in a continuous loop so as to extend in the proximity of each of the terminals 14. In the preferred embodiment of the invention the channel takes the form of a section of coaxial cable but in alternative forms of the invention other communication media such as twisted wire pairs, optical fibers or the like could be employed.

The communication channel 16 must have bi-directional capability even if all of the terminals can only transmit to or receive from the head-end. In the preferred embodiment of the invention this bi-directional capability is maintained over long distance on the coaxial cable channel 16 by providing spaced amplifiers each consisting of a back-to-back pair of primary channel amplifiers 18, which operate in one direction along the loop, the clockwise direction as illustrated in the drawing, and secondary channel amplifiers 20 connected in shunt with each primary channel amplifier and operative to pass signals in the opposite direction, the counterclockwise direction in the drawing. These amplifier pairs are spaced at appropriate distances to maintain the necessary signal level at each of the terminals. Smaller cable loop may not require amplifiers.

In the preferred embodiment of the invention signals are sent over the cable using four separate, non-overlapping frequency bands. These bands are divided into two channels. For simplicity they are called primary and secondary and operate as follows:

Normal Mode

Head-end transmits on primary channel F1
Terminals receive on primary channel F1
Terminals transmit on secondary channel F2
Head-ends receive on secondary channel F2

Failure Mode

Head-end transmits on secondary channel F3
Terminals receive on secondary channel F3
Terminals transmit on primary channel F4
Head-end receives on primary channel F4

As will be seen, the primary and secondary channels are transmitted in opposite directions on the communication medium.

In the preferred embodiment of the invention the primary band-width may be 150–300 megahertz and the secondary band-width 5–150 megahertz. Other arrangements wherein the two channels share the operative capability of the communication channel less equally may alternatively be employed.

At the head-end 12, the computer 10 provides data signals to be transmitted to the terminals 14 to a pair of transmitters: a primary channel transmitter 22 and a secondary channel transmitter 24. The transmitter 22 operates on a section of the primary channel band-width F1 while the transmitter 24 operates on a section of the secondary channel band-width F3. The primary channel transmitter 22 is connected to one end of the coaxial cable 16 which allows its signals to be passed by the primary channel amplifiers 18 and thus propogate along the coaxial cable in a clockwise direction as shown in the drawing. The secondary channel transmitter 24 is connected to the opposite end of the cable so that its signals may be amplified by the secondary channel amplifiers 20 and may propogate around the cable in a counterclockwise direction.

Similarly, the computer 10 may receive data from the communication channel 16 through either its primary channel receiver 26 or a secondary channel receiver 28. The outputs of receivers are summed and provided to the computer 10. The primary channel receiver 26 is connected to the same end of the coaxial cable 16 as is the secondary channel transmitter so that the receiver will accept all primary channel signals on band-width F4 passed by the amplifiers 18 in a clockwise direction. The secondary channel receiver 28 is connected to the same end of the coaxial cable 16 as is the primary channel transmitter. It thus receives all secondary channel transmissions on band-width F2 carried along the cable in a counterclockwise direction.

In the normal mode of operation of the system the primary channel transmitter 22 and the secondary channel receiver 28 at the head-end are energized while the secondary channel transmitter 24 and the primary channel receiver 26 are de-energized.

The head-end includes a primary carrier detector 30 connected to the same end of the cable as the primary channel receiver 26 to receive primary channel communication passed around the cable in a clockwise direction on band-width F1. The primary channel transmitter 22 continuously sends out a carrier on F1 although the carrier only contains modulation when data is being received by the transmitter 22 from the computer 10. The primary carrier detector 30 normally receives this carrier and provides an output signal at one of two binary levels. Should the primary transmitter 22 fail, or should there be an interruption in the cable 16 at any point, the detector 30 will not receive the primary carrier and its output will change level.

The output is provided to a time delay unit 32. The time delay unit provides an output at a first binary level as long as it receives an input signal from the detector 30, indicating that the primary channel carrier is being received. When that signal changes level to a state indicating that the primary channel signal is not being received, and remains at that state for a predetermined period of time, such as one second, the time delay unit 32 will provide outputs to the secondary channel transmitter 24 and the primary channel receiver 26 switching those two units to their energized states. This output is also sensed by the computer 10. The time delay insures that this switch-over will not occur in the event of a random, short-term interrmittent failure of the primary channel transmitter or of the detector 30.

When the secondary channel transmitter and the primary channel receiver 26 are energized the companion transmitters and receivers 24 and 28 may remain energized and accordingly data can be sent out over the communication channel in two directions at two bandwidths, to the extent that the primary channel transmitter is functioning. Data from the cable is also provided to the computer by both the primary and secondary channel receivers 26 and 28 during this time. When the primary carrier detector 30 begins to receive the primary channel carrier again, the secondary channel transmitter and primary channel receiver are switched off after an appropriate time delay, which may be different from the previous delay.

Each terminal 14 includes a primary channel receiver 34 and a secondary channel receiver 36, both permanently connected to the cable by lead-in conductor 38. The primary channel receiver is normally energized and the secondary channel receiver 36 is normally de-energized. Similarly, each terminal having transmission capability includes a primary channel transmitter 40 and a secondary channel transmitter 42, both connected to the cable through the lead-in 38. The secondary channel transmitter 42 is normally energized and a primary channel transmitter 40 is normally de-energized. Thus, during normal operation of the system, each terminal will receive data sent over the cable via a primary channel receiver 34 and will respond to the computer over the secondary channel, employing a secondary channel transmitter 42. Communications from the head-end to the terminals thus proceed in a clockwise direction and signals from the terminals to the head-end are carried in the opposite direction. Both the primary and secondary channel receivers 34 and 36 provide output to a terminal proper 44 while output from the terminal proper is provided to both a primary channel transmitter 40 and the secondary channel transmitter 42.

The terminal proper 44 will normally include input and output devices such as keyboards and video displays, and may include computational capability. The terminal proper will also include capability for determining when a particular signal received from the coaxial cable is addressed to that particular terminal. This capability may include a unique address storage device, means for comparing an address received from the cable with this stored address. None of these internal terminal elements are illustrated as they are well known to the art and do not form part of the present invention.

Each terminal also includes a primary carrier detector 46 of the same design as the detector 30 associated with the head-end. Detector 46 is connected to the cable 16 through the lead-in 38 and provides an output of one level to a latch 48 when a carrier is detected and an output of a second level in the absence of a carrier. In certain embodiments of the invention an appropriate time delay might be provided between the detector 46 and the latch 48. The latch 48 is essentially a bi-stable device and when the output of the primary carrier detector 46 shifts to a level indicating the absence of the carrier the latch changes state and remains in that changed state until the signal from the primary carrier detector 46 indicates that the primary carrier is again being received.

In another embodiment of the invention the latch 48 remains in that changed state until the computer commands it to change state via a message sent via the secondary channel. Once the message is received the latch will switch only if the signal from the primary carrier detector 46 indicates that the primary carrier is again being received.

The latch 46 controls the energization of the secondary channel receiver 36 and the primary channel transmitter 40. As long as a primary carrier is being received by the terminal, the units 36 and 40 are de-energized. In the absence of the carrier they become energized and accordingly the terminal receives on the secondary channel and transmits to the computer on the primary channel. This mode of operation continues until the primary carrier is restored and if necessary a signal is received from the head-end allowing the latch to switch back to its normal mode, de-energizing the receiver 36 and the transmitter 40.

In normal operation signals are sent from the head-end to all of the terminals over the primary channel on band-width F1 and are propogated in a clockwise direction as viewed in the drawing. The terminals communicate with the computer over the secondary channel on band-width F2 and these signals propogate in a counterclockwise direction. In the event of failure of the primary channel transmitter 22 in the head-end, the primary carrier detector 30 would cause the secondary channel transmitter 24 and the head-end to be energized. Simultaneously, the primary carrier detectors 46 in the terminals would cause the secondary channel receivers and the primary channel transmitters in the terminals to be energized. Thereafter, the head-end would transmit to the terminals over the secondary channel on band-width F3, in a counterclockwise direction, and the terminals would transmit to the head-end over the primary channel on band-width F4, in a clockwise direction.

In the event of a break in the cable only certain of the terminals would reverse the channels on which they receive and transmit: those terminals on the primary channel transmitter side of the break would continue to operate in a normal manner, receiving on the primary channel and responding on the secondary channel; those terminals on the secondary transmitter 24 side of the break would reverse channels, transmitting on the primary channel and receiving on the secondary channel.

Thus redundant capability allows periodic analysis of the system operation under control of the head-end computer 10. This analysis protocol involves transmission of a signal to each of the terminals in sequence over the primary channel and the detection of their responses on the secondary channel. Next the primary transmitter is de-energized and the secondary channel transmitter 24 and the primary channel receiver 26 are energized at the head-end, and after a small time delay the terminals are again sequentially polled. A comparison of the responses received during the first and second polling would indicate the operational status of all of the terminals. If a terminal responded normally during both pollings, it is operating properly and the transmission line is unbroken. If a terminal responds normally during one polling but not the other, either some of its components are not operating properly or the cable is broken. The logical possibilities are reduced by determination of the manner of response of the other terminals.

In the preferred embodiment of the invention utilizing wide band coaxial cable such as is used for community cable television the primary and secondary channels contain sufficient band-width to accommodate many multiple terminal systems of this type on a single cable network.

The embodiments of the invention in which an exclusive property or privilege is claimed are defined as follows:

1. A communication system for connecting a computer to a plurality of separated, remotely spaced terminals, comprising: a continuous segment of bi-directional communication channel connected to each of the terminals; a primary transmitter having its output connected to a first end of the communication channel; a secondary transmitter having its output connected to the second end of the communication channel output connections from the computer to each of the transmitters; a detector for the primary transmitter signal connected to the end of the communication channel adjacent to the secondary transmitter; and switch means controlled by the output of the primary transmitter signal detector for energizing the secondary transmitter when the detector fails to receive the primary transmitter signal, whereby, in the event of failure of the primary transmitter or interruption within the communication channel, the secondary transmitter will provide the computer output to those terminals unable to receive the primary transmitter signal.

2. The communication system of claim 1 wherein the communication channel extends as a continuous loop, beginning and ending adjacent to a head-end location containing the primary and secondary transmitters.

3. The communication system of claim 1 wherein the primary and secondary transmitters operate on different band-widths and each terminal includes a pair of receivers, one for the primary transmitter band and one for the secondary transmitter band; and further including a primary band signal detector at each terminal and switching means for energizing the secondary band receiver at each terminal, each switching means controlled by the output of the primary band signal detector at that terminal.

4. The communication system of claim 1 wherein the communication channel consists of a single section of coaxial cable.

5. The communication system of claim 1 including signal transmitters associated with each of the terminals and connected to the communication channel, and a receiver having its input connected to both ends of the communication channel and having its output connected to the computer.

6. The communication system of claim 1 wherein the signal transmitters associated with each of the terminals include a pair of transmitter members, the members of the pair being operative to provide output on different band-widths and the receiver having its input connected to both ends of the communication channel comprises a pair of receiver members, each operative to receive one of the bands transmitted by one of the transmitter members associated with each of the terminals.

7. The communication system of claim 5 wherein each terminal includes means conditioned by a signal received from the computer, over the communication channel, for energizing the transmitter associated with that terminal.

8. The communication system of claim 6 wherein the primary and secondary transmitters provide outputs on separated band-widths and each terminal includes a pair of receivers, one for the primary transmitter band-width and the other for the secondary transmitter band-width, and further including a plurality of primary channel signal detectors, one associated with each terminal, and a plurality of switches for energizing the secondary channel band-width receivers, one associated with each terminal, and each being conditioned by the primary transmitter signal detector associated with that terminal.

9. A communication system, comprising: a computer; a plurality of terminals disposed at remote, spaced locations relative to the computer; a continuous, elongated segment of a signal conductor running along a path extending in proximity to the computer and to each of the terminals; signal conducting connections extending between the signal conductor and each of the terminals; a primary transmitter connected to one end of the signal conductor and providing output to the signal conductor on a first band-width; a secondary transmitter connected to the opposite end of the signal conductor and providing output to the signal conductor on a secondary band-width, which differs from the first band-width; output connections from the computer to both the primary and secondary transmitters; a primary transmitter signal sensor connected to the signal conductor adjacent to the end connected to the secondary transmitter; a secondary transmitter control circuit connected to the output of the last said sensor and operative to energize the secondary transmitter when the sensor does not detect a primary transmitter signal; and pairs of first and second band-width receivers associated with each terminal; whereby signals from the computer are normally transmitted to the terminals employing the primary transmitter and in the event of failure of the primary transmitter or of interruption of the signal conductor the secondary transmitter is energized and provides output to the signal conductor.

10. The communication system of claim 9 including primary transmitter signal detectors associated with each of the terminals, each being connected to the secondary channel receiver associated with that terminal and being operative to energize the secondary channel receiver in the absence of receipt of the primary transmitter signal from the signal conductor.

11. The communication system of claim 10 including means associated with each terminal, and controlled by a signal from the computer, to de-energize the secondary transmitter signal receiver associated with that terminal.

12. The communication system of claim 1 wherein each said means for de-energizing a secondary channel receiver is conditioned by the output of the primary channel detector associated with that terminal so that the secondary channel receiver in each terminal is maintained energized until the terminal receives a signal on the primary channel and a conditioning signal from the computer via the secondary channel.

13. The communication system of claim 10 wherein the signal conductor comprises a single elongated section of coaxial cable.

14. The communication system of claim 9 wherein the signal conductor is formed in a single continuous loop with its two ends adjacent to one another.

15. The communication system of claim 1 wherein the communication channel consists of one or more optical fibers.

16. The communication system of claim 10 wherein the original conductor comprises of one or more optical fibers.

* * * * *